United States Patent
Smith et al.

(10) Patent No.: US 10,621,834 B2
(45) Date of Patent: Apr. 14, 2020

(54) SYSTEMS AND METHODS FOR PROVIDING AUTOMATIC TELLER MACHINE SECURITY

(71) Applicant: Capital One Services, LLC, McLean, VA (US)

(72) Inventors: Robert Smith, Richmond, VA (US); David Wurmfeld, Falls Church, VA (US); Steve Faletti, Brooklyn, NY (US); Lisa Whitsitt, San Francisco, CA (US); Janak Dadhaniya, San Francisco, CA (US)

(73) Assignee: Capital One Services, LLC, McLean, VA (US)

( * ) Notice: Subject to any disclaimer, the term of this patent is extended or adjusted under 35 U.S.C. 154(b) by 4 days.

(21) Appl. No.: 16/102,161

(22) Filed: Aug. 13, 2018

(65) Prior Publication Data

US 2020/0051404 A1    Feb. 13, 2020

Related U.S. Application Data

(63) Continuation of application No. 16/058,990, filed on Aug. 8, 2018.

(51) Int. Cl.
*G07F 19/00* (2006.01)
*G06Q 20/18* (2012.01)
*G06Q 20/10* (2012.01)

(52) U.S. Cl.
CPC .......... *G07F 19/206* (2013.01); *G07F 19/201* (2013.01); *G07F 19/205* (2013.01); *G06Q 20/1085* (2013.01); *G06Q 20/18* (2013.01); *G07F 19/20* (2013.01); *G07F 19/207* (2013.01)

(58) Field of Classification Search
CPC ...... G07F 19/20; G07F 19/205; G07F 19/201; G07F 19/207; G06Q 20/1085; G06Q 20/40
See application file for complete search history.

(56) References Cited

U.S. PATENT DOCUMENTS

| | | | |
|---|---|---|---|
| 5,825,436 A * | 10/1998 | Knight | G02F 1/1323 349/16 |
| 6,552,850 B1 | 4/2003 | Dudasik | |
| 6,601,045 B1 * | 7/2003 | DePietro | G07F 19/207 235/379 |
| 7,090,122 B1 * | 8/2006 | Warren | G06Q 20/042 235/379 |

(Continued)

FOREIGN PATENT DOCUMENTS

| | | | | |
|---|---|---|---|---|
| JP | 2006039841 A | * | 2/2006 | |
| JP | 2009146331 A | * | 7/2009 | |

*Primary Examiner* — Christopher Stanford
(74) *Attorney, Agent, or Firm* — Finnegan, Henderson, Farabow, Garrett & Dunner LLP

(57) ABSTRACT

Computer implemented systems and methods are provided for an automatic teller machine. In some embodiments, an automatic teller machine may comprise a display, a physical barrier configured to intersect a line of sight from a location adjacent the automatic teller machine to the display, one or more memory devices storing instructions, and one or more processors. The one or more processors may be configured to determine that a user is operating the automatic teller machine. The one or more processors may be further configured to alter a degree of opacity of the physical barrier, based on the determining.

20 Claims, 12 Drawing Sheets

(56) References Cited

U.S. PATENT DOCUMENTS

| | | | | |
|---|---|---|---|---|
| 7,337,955 B1* | 3/2008 | Block | ............ | G06Q 20/102 |
| | | | | 235/379 |
| 8,640,946 B1* | 2/2014 | Block | ............ | G06Q 20/1085 |
| | | | | 235/379 |
| 8,651,373 B1* | 2/2014 | Block | ............ | G06Q 20/1085 |
| | | | | 235/379 |
| 8,922,480 B1* | 12/2014 | Freed | ............ | G09G 5/00 |
| | | | | 345/156 |
| 8,955,743 B1* | 2/2015 | Block | ............ | G07F 19/207 |
| | | | | 235/379 |
| 10,049,402 B1* | 8/2018 | Miranda | ............ | G06Q 20/1085 |
| 2005/0252984 A1* | 11/2005 | Ahmed | ............ | F24F 11/30 |
| | | | | 236/51 |
| 2005/0263586 A1* | 12/2005 | Lute, Jr. | ............ | G06Q 20/1085 |
| | | | | 235/379 |
| 2009/0102990 A1 | 4/2009 | Walton et al. | | |
| 2009/0165683 A1* | 7/2009 | Bakke | ............ | E05G 5/02 |
| | | | | 109/49.5 |
| 2012/0074217 A1* | 3/2012 | Block | ............ | G06Q 20/327 |
| | | | | 235/379 |
| 2016/0098709 A1 | 4/2016 | Johnson et al. | | |

* cited by examiner

US 10,621,834 B2

SYSTEMS AND METHODS FOR PROVIDING AUTOMATIC TELLER MACHINE SECURITY

This application is a continuation of U.S. patent application Ser. No. 16/058,990, filed on Aug. 8, 2018 (pending), and entitled "SYSTEMS AND METHODS FOR PROVIDING AUTOMATIC TELLER MACHINE SECURITY." The disclosure of the above-referenced application is expressly incorporated herein by reference in its entirety.

TECHNICAL FIELD

The disclosed embodiments generally relate to improvements to automatic teller machines, and particularly, to improvements to automatic teller machines through hardware and software embodiments enhancing ATM security through configurable physical barriers.

BACKGROUND

The ubiquity of automatic teller machines, or ATMs, has increased substantially in recent decades. While greater availability and improved features have made ATMs more useful in certain ways, numerous limitations in ATM design have remained. An ATM, such as the ATM 100 depicted in FIG. 1, may appear approachable, and allow users to have an open view of their surroundings, but may be difficult to protect from the view of others, which may raise concerns among some users related to identity theft or general privacy.

Other ATMs, such as the ATM 200 depicted in FIG. 2, may include privacy barriers, such as privacy barriers 250. Such privacy barriers may obscure viewing angles that may enhance privacy, but obscuring the viewing angles may make the ATM appear less approachable, may leave users feeling less aware of their surroundings, or may be used by criminals to hide illegal activity unrelated to use of the ATM.

Many aspects of conventional ATM design, such as the presence or absence of privacy barriers are often fixed and unchangeable when an ATM is in service, resulting in a tradeoff between the advantages of including privacy barriers and the advantages of a more open design which omits such barriers.

In view of the shortcomings of current ATM systems, improved ATM designs are desired.

SUMMARY

Disclosed embodiments provide methods and systems for improved ATM security. Disclosed embodiments improve upon disadvantages of conventional ATM technologies, for example by providing barriers that may be configured to enhance privacy and prevent identity theft, without making the ATM enclosed or isolated, and without providing privacy to those that are not operating the ATM.

Consistent with a disclosed embodiment, an automatic teller machine is provided. The automatic teller machine may include a display, a physical barrier configured to intersect a line of sight from a location adjacent the automatic teller machine to the display, one or more memory devices storing instructions, and one or more processors. The one or more processors may be configured to execute the instructions to perform operations. The operations may include determining that a user is operating the automatic teller machine. The operations may also include, based on the determining, altering a degree of opacity of the physical barrier.

Consistent with another disclosed embodiment, a method for providing automatic teller machine security is provided. The method may comprise determining that a user is operating the automatic teller machine. The method may also include based on the determining, altering an opacity of a physical barrier of the automatic teller machine, the physical barrier being configured to intersect one or more viewing angles of the display.

Consistent with other disclosed embodiments, non-transitory computer-readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIGS. 8A, 8B, 80, and 8D depict exemplary ATM privacy barriers;

FIGS. 12A, 12B, 120, 12D, 12E, and 12F depict exemplary ATM privacy barriers.

DETAILED DESCRIPTION

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
FIG. 1 depicts an exemplary ATM, consistent with disclosed embodiments.
Figure 3:
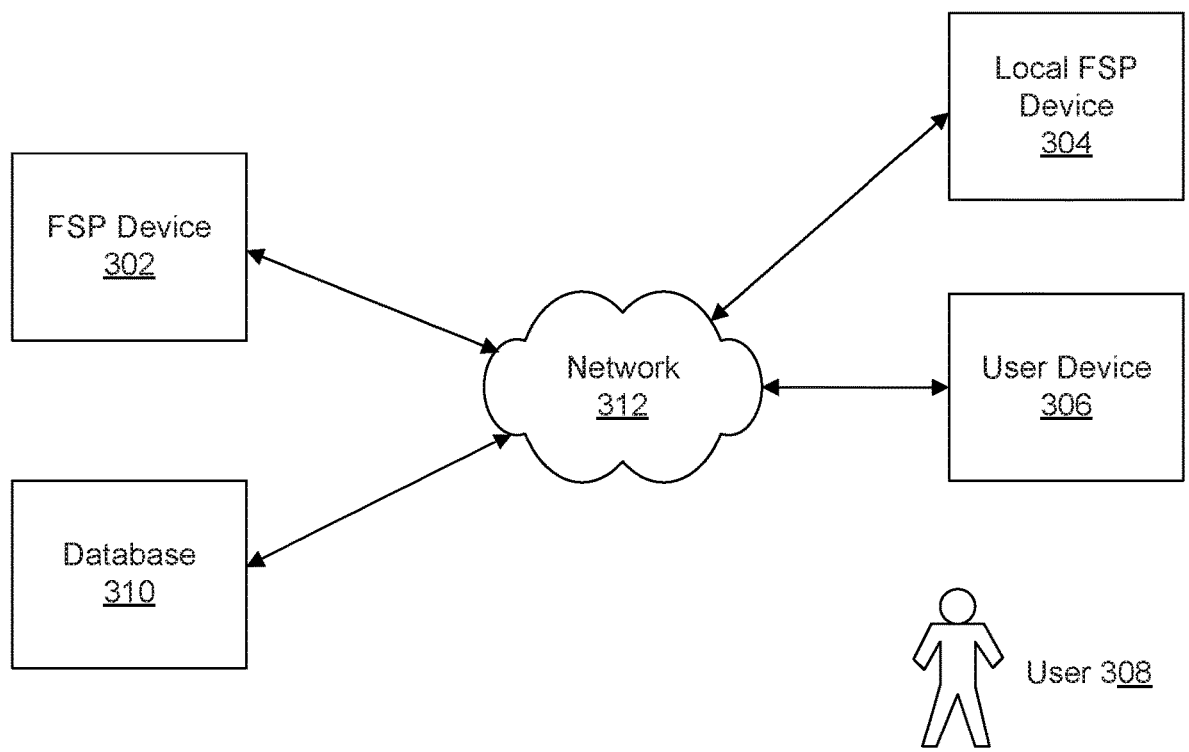
FIG. 3 is a diagram of an exemplary system, consistent with disclosed embodiments.

FIG. 3 shows a diagram of an exemplary system 300, consistent with disclosed embodiments. As shown in FIG. 1, system 300 may include a financial service provider device 302 ("FSP device"), a local financial service provider device 304 ("local FSP device"), a user device 306, a database 310, and a network 312 to facilitate communication among the components of system 300. The components and arrangement of the components included in system 300 may vary. Thus, system 300 may further include other components that perform or assist in the performance of one or more processes consistent with the disclosed embodiments. The components and arrangements shown in FIG. 3 are not intended to limit the disclosed embodiments, as the components used to implement the disclosed processes and features may vary.

In accordance with disclosed embodiments, system 300 may include an FSP device 302. FSP device 302 may be a system associated with a financial service provider, such as a bank, a credit card company, a lender, brokerage firm, or any other type of financial service entity that generates, provides, manages, and/or maintains financial service accounts, etc. for one or more users. FSP device 302 may include one or more computing systems that are configured to execute software instructions stored on one or more memory devices to perform one or more operations consistent with the disclosed embodiments. For example, FSP device 302 may include one or more memory device(s) storing data and software instructions, and one or more processor(s) configured to use the data and execute the software instructions to perform server-based functions and operations. FSP device 302 may include one or more portable computers, mainframe computers, or any combination of such devices.

In certain embodiments, FSP device 302 may be configured as a particular apparatus, system, and the like based on the storage, execution, and/or implementation of the software instructions that perform one or more operations consistent with the disclosed embodiments. FSP device 302 may be a standalone device, or it may be a part of a subsystem, which may be a part of a larger system. For example, FSP device 302 may include distributed servers that are remotely located and communicate over a network (e.g., network 312) or over a dedicated network, such as a local area network ("LAN"), for a financial service provider. An exemplary computing system consistent with FSP device 302 is discussed in additional detail with respect to FIG. 4, below.

FSP device 302 may include or may access one or more storage devices configured to store data and/or software instructions used by one or more processors of FSP device 302 to perform operations consistent with disclosed embodiments. For example, FSP device 302 may include one or more memories configured to store one or more software programs that performs several functions when executed by a processor. The disclosed embodiments are not limited to separate programs or computers configured to perform dedicated tasks. For example, FSP device 302 may include one or more memories, storing a single program or multiple programs. Additionally, FSP device 302 may execute one or more programs located remotely from FSP device 302. For example, FSP device 302 may access one or more remote programs, stored in one or more memories included with a remote component, system computer, server, etc., which when executed, perform operations consistent with the disclosed embodiments. In certain aspects, FSP device 302 may include one or more servers capable of executing software that generates, maintains, and provides services associated with financial account management. In other aspects, FSP device 302 may connect separate server(s) or similar computing devices that generate, maintain, and provide services associated with financial data for a financial service provider associated with FSP device 302.

System 300 may also include one or more local FSP devices 304. Local FSP devices may include, for example, Automatic Teller Machines ("ATMs") or similar devices physically located in financial service provider branches or in other locations (e.g., retail locations, gas stations, etc.).

Local FSP device 304 may include one or more memory device(s) that store data and/or instructions that may be used for performing one or more processes consistent with the disclosed embodiments. In certain aspects, local FSP device 304 may additionally, or alternatively, include one or more computer devices. For example, local FSP device 304 may include one or more memory device(s) storing data and software instructions and one or more processor(s) configured to use the data and execute the software instructions to perform computing functions and operations.

Local FSP device 304 may include one or more computer device(s) that may be a general-purpose computer, server, mainframe computer, or any combination of these components. In certain embodiments, local FSP device 304 (or a system including local FSP device 304) may be configured as a particular apparatus, system, and the like based on the storage, execution, and/or implementation of the software instructions that perform one or more operations consistent with the disclosed embodiments. A local FSP device 304 may be a standalone device, or it may be part of a subsystem, which may be part of a larger system. For example, local FSP device 304 may represent distributed servers that are remotely located and communicate over a network (e.g., network 312) or over a dedicated network, such as a LAN. An exemplary computer system consistent with local FSP device 304 is discussed in additional detail with respect to FIG. 4. In certain embodiments, a third party may operate the components associated with local FSP device 404. Additionally or alternatively, local FSP device 404 may be a part or a subpart of FSP device 102.

System 300 may further include one or more user devices 306. A user 308 may operate a user device 306, which may include a desktop computer, laptop, tablet, smartphone, multifunctional watch, pair of multifunctional glasses, tracking device, chip-enabled payment card, or any suitable device with computing capability. User device 306 may include one or more processor(s) and memory device(s). For example, user device 306 may include memory device(s) that store data and software instructions that, when executed by one or more processor(s), perform operations consistent with the disclosed embodiments. In one aspect, user device 306 may have a financial application installed thereon, which may enable user device 306 to communicate with FSP device 302 and/or with local FSP device 304 via network 312. For instance, user device 306 may be a smartphone or tablet (or the like) that executes a mobile application that performs online banking operations. In other embodiments, user device 306 may connect to FSP device 302 and/or local FSP device 304 through use of browser software stored and executed by user device 306. User device 306 may be configured to execute software instructions to allow a user to access information stored in FSP device 302, such as, for example, financial information related to purchase transactions, financial statements, account information, rewards program information, etc. Additionally, user device 306 may be configured to execute software instructions that initiate and conduct transactions with FSP device 302 or local FSP device 304, such as, for example, ATM withdrawals, wire transfers, debit card PIN resets, call center transactions, etc. An exemplary computer system consistent with user device 306 is discussed in additional detail with respect to FIG. 4.

User 308 may operate user device 306 to perform one or more operations consistent with disclosed embodiments. In one aspect, user 308 may be a customer of a financial service provider associated with FSP device 302. For instance, a financial service provider may maintain a financial service account (e.g., checking account, savings account, debit card account, credit card account, etc.) for user 308 that the user may use to purchase goods and/or services. Additionally or alternatively, user 308 may use user device 306 and the financial service account (for example, through a mobile application installed on user device 106) to, for example, withdraw cash from an ATM (such as local FSP device 304), contact a customer call center, transfer or wire money, or reset their debit account PIN.

User 308 may further operate user device 306 in order to be detected and recognized by local FSP device 304. For example, user device 306 may detect, through the user of network 312, a local FSP device 304 in its immediate proximity. Additionally or alternatively, local FSP device 304 may detect user device 306 in its immediate proximity. User device 306 may then connect to local FSP device 304 in order to initiate, conduct, or complete a financial transaction.

System 300 may also include one or more databases 310. Database 310 may include one or more memory device(s) that store data that may be used for performing one or more processes consistent with the disclosed embodiment. In certain aspects, database 310 may additionally, or alternatively, include one or more servers or other type of computer devices. The database 310 server(s) may be one or more computing devices configured to execute software instructions stored in memory to perform one or more processes consistent with the disclosed embodiments. For example, database 110 may include one or more memory device(s) storing data and software instructions and one or more processor(s) configured to use the data and execute the software instructions to perform server-based functions and operations known to those skilled in the art.

Database 310 may further include server(s) that are configured to execute stored software instructions to perform operations associated with collecting, storing, and accessing profile data related to user 308, including one or more processes associated with gathering, for example, data related to user 308's demographics, accessibility needs, display preferences, biometrics information. Database 310 may include one or more servers that may be a general purpose computer, a mainframe computer, or any combination of these components. In certain embodiments, database 310 (or a system including database 310) may be configured as a particular apparatus, system, and the like based on the storage, execution, and/or implementation of the software instructions that perform one or more operations consistent with the disclosed embodiments. A database 310 may be standalone, or it may be part of a subsystem, which may be part of a larger system. For example, personalization database 310 may represent distributed servers that are remotely located and communicate over a network (e.g., network 312) or a dedicated network, such as a LAN. An exemplary computer system consistent with database 310 is discussed in additional detail with respect to FIG. 4

Network 312 may comprise any type of computer networking arrangement used to exchange data. For example, network 312 may be the Internet, a private data network, a virtual private network using a public network, a WiFi network, a LAN or WAN network, and/or other suitable connections that may enable information exchange among various components of the system 300. Network 312 may also include a public switched telephone network ("PSTN") and/or a wireless cellular network. Network 312 may be a secured network or unsecured network. In other embodiments, one or more components of system 300 may communicate directly through a dedicated communication link(s), such as links between user device 306, FSP device 302, local FSP device 304, and personalization database 310.

Additionally or alternatively, network 312 may include a direct communication network. Direct communications may use any suitable technologies, including, for example, Bluetooth™, Bluetooth LE™ (BLE), WiFi, near field communications (NFC), or other suitable communication methods that provide a medium for transmitting data between separate devices. In certain embodiments, user device 306 and local FSP device 304 may connect and communicate through a direct communications network, for example, based on any of the above networking technologies.

Other components known to one of ordinary skill in the art may be included in system 300 to process, transmit, provide, and receive information consistent with the disclosed embodiments.

Figure 4:
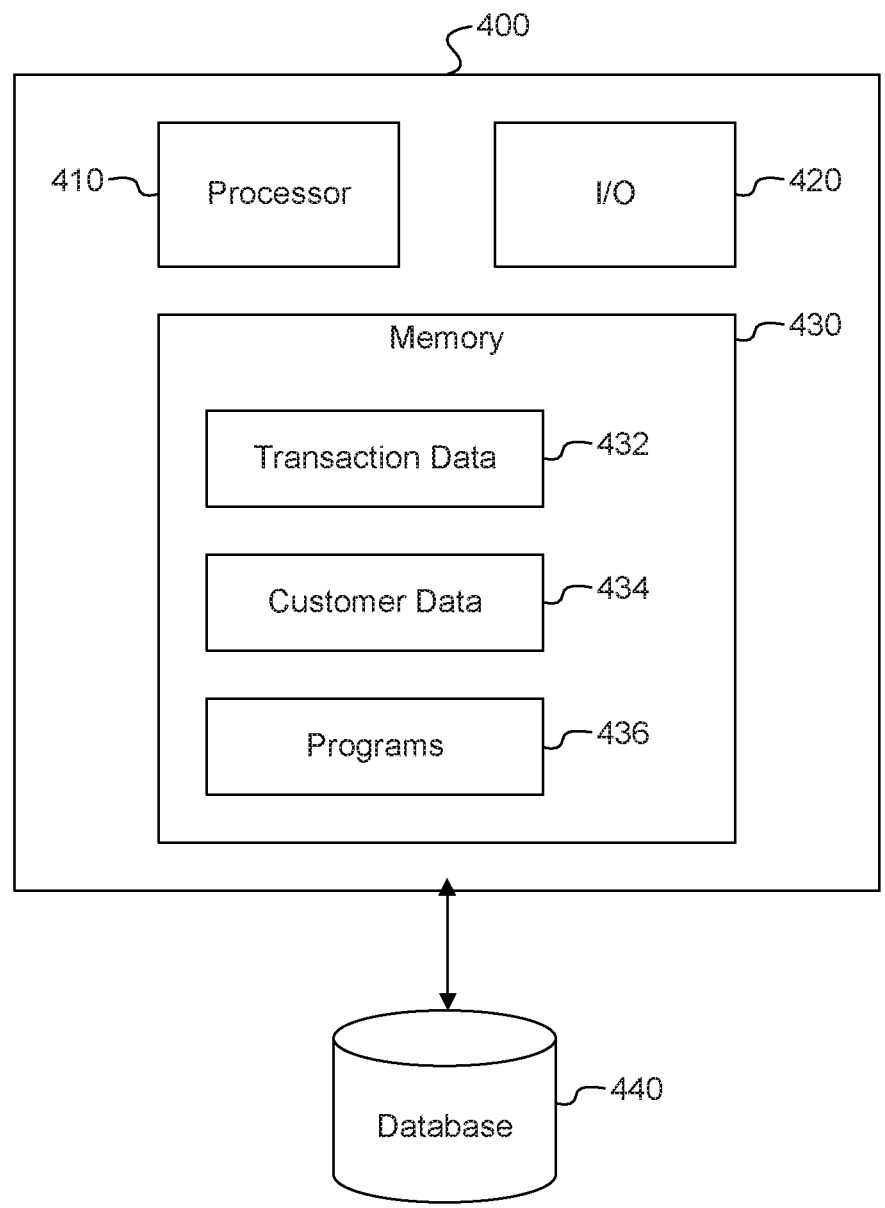
FIG. 4 is a diagram of an exemplary computer system, consistent with disclosed embodiments.

FIG. 4 shows a diagram of an exemplary computing system 400 illustrating a computing system configuration that may be associated with FSP device 302, local FSP device 304, user device 306, and/or personalization device 310, consistent with disclosed embodiments. In one embodiment, computing system 400 may have one or more processors 410, one or more memories 430, and one or more input/output (I/O) devices 420. In some embodiments, computing system 400 may take the form of a server, general purpose computer, a mainframe computer, laptop, smartphone, mobile device, or any combination of these components. In certain embodiments, computing system 400 (or a system including computing system 400) may be configured as a particular apparatus, system, and the like based on the storage, execution, and/or implementation of the software instructions that perform one or more operations consistent with the disclosed embodiments. Computing system 400 may be a standalone system, or it may be part of a subsystem, which may be part of a larger system.

Processor 410 may include, for example, one or more known processing devices, such as a microprocessor from the Pentium™ or Xeon™ family manufactured by Intel™, the Turion™ family manufactured by AMD™, or any of various processors manufactured by Sun Microsystems. Processor 410 may constitute a single core or multiple core processor that executes parallel processes simultaneously. For example, processor 410 may be a single core processor configured with virtual processing technologies. In certain embodiments, processor 410 may use logical processors to simultaneously execute and control multiple processes. Processor 410 may implement virtual machine technologies, or other known technologies to provide the ability to execute, control, run, manipulate, store, etc. multiple software processes, applications, programs, etc. In another embodiment, processor 410 may include a multiple-core processor arrangement (e.g., dual, quad core, etc.) configured to provide parallel processing functionalities to allow computing system 400 to execute multiple processes simultaneously. One of ordinary skill in the art would understand that other types of processor arrangements could be implemented that provide for the capabilities disclosed herein. The disclosed embodiments are not limited to any type of processor(s) configured in computing system 400.

Memory 430 may include one or more storage devices configured to store instructions used by processor 410 to perform functions related to the disclosed embodiments. For example, memory 430 may be configured with one or more software instructions, such as program(s) 436 that may perform one or more operations when executed by processor 410. The disclosed embodiments are not limited to separate programs or computers configured to perform dedicated tasks. For example, memory 430 may include a program 436 that performs the functions of computing system 400, or program 436 could comprise multiple programs.

Additionally, processor 410 may execute one or more programs located remotely from computing system 400. For example, FSP device 302, local FSP device 304, user device 306, or personalization database 310, may, via computing system 400 (or variants thereof), access one or more remote programs that, when executed, perform functions related to certain disclosed embodiments. Processor 410 may further execute one or more programs located in database 440. In some embodiments, programs 436 may be stored in an external storage device, such as a cloud server located outside of computing system 400, and processor 410 may execute programs 436 remotely.

Programs executed by processor 410 may cause processor 410 to execute one or more processes related to financial services provided to users including, but not limited to, processing credit and debit card transactions, checking transactions, fund deposits and withdrawals, transferring money between financial accounts, lending loans, processing payments for credit card and loan accounts, processing orders for certified funds, processing orders for new or reissue debit cards, and processing ATM cash withdrawals.

Memory 430 may also store data that may reflect any type of information in any format that the system may use to perform operations consistent with the disclosed embodiments. Memory 430 may store instructions to enable processor 410 to execute one or more applications, such as server applications, network communication processes, and any other type of application or software. Memory 430 may be a volatile or non-volatile, magnetic, semiconductor, tape, optical, removable, non-removable, or other type of storage device or tangible (i.e., non-transitory) computer-readable medium.

Memory 430 may include transaction data 432. Transaction data 432 may include information related to financial transactions initiated by a user. For example, transaction data may include a user identifier and a transaction type. The user identifier may be a credit or debit card number, and account number, or another means for identifying the user, initiating the financial transaction. The transaction type may include an indicator of the type of transaction the user is initiating, such as, ATM cash withdrawal, debit PIN reset, money wire or transfer, call to the customer service center, ordering a new or reissue debit card, ordering certified funds, or other transactions requiring user authentication. Transaction data 432 may also include, for example, authentication data obtained from the user for the purposes of authorizing the transaction by verifying the authenticity of provided biometric data as compared to stored biometric data. Additionally or alternatively, transaction data 432 may be stored in database 440 or in an external storage (not shown) in communication with computing system 400 via network 312 or any other suitable network.

Memory 430 may further include customer data 434. Customer data 434 may include information about particular customers of the financial service provider. For example, customer data 434 may include clients' account information, debit or credit card information, history of purchase transactions, financial statements, credit score, risk profile, username and password, debit card PIN, home and work locations, and/or biometric information. Additionally, customer data 434 may include, for example, user device identification information, such as, for example, a phone number, email address, IP address, Bluetooth signature, or other device identifier. Alternatively customer data 434 may be stored in database 440, or in an external storage (not shown) or in database 310 in communication with computing system 400 via network 312 or any other suitable network.

Processor 410 may analyze transaction data 432 with reference to customer data 434. For example, processor 410 may analyze transaction data to determine which client with information stored in customer data 434 is initiating the financial transaction. Processor 410 may access the particular user's customer information to determine, for example, their account information, debit or credit card information, history of purchase transactions, financial statements, credit score, risk profile, username and password, debit card PIN, home and work locations, and/or authentication data.

I/O devices 420 may include one or more devices configured to allow data to be received and/or transmitted by computing system 400. I/O devices 420 may include one or more digital and/or analog communication devices that allow computing system 400 to communicate with other machines and devices, such as other components of system 300 shown in FIG. 3. For example, computing system 400 may include interface components, which may provide interfaces to one or more input devices, such as one or more keyboards, mouse devices, displays, touch sensors, card readers, biometric readers, cameras, scanners, microphones, wireless communications devices, and the like, which may enable computing system 200 to receive input from an operator of local FSP device 302, such as user 308.

Computing system 400 may also contain one or more database(s) 440. Alternatively, computing system 400 may be communicatively connected to one or more database(s) 440. Computing system 400 may be communicatively connected to database(s) 440 through network 312. Database 440 may include one or more memory devices that store information and are accessed and/or managed through computing system 400. By way of example, database(s) 440 may include Oracle™ databases. Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. Database 440 may include computing components (e.g., database management system, database server, etc.) configured to receive and process requests for data stored in memory devices of database(s) 240 and to provide data from database 440.

As discussed above, local FSP device 304 may include at least one computing system 400. Further, although sometimes discussed here in relation to local FSP device 304, it should be understood that instances or variations of computing system 400 may be used by other components of system 300, including FSP device 302 user device 306, and personalization database 310. Computing system 400 may be a standalone device or server or may be configured as a distributed computer system including multiple servers or computers that interoperate to perform one or more of the processes and functionalities associated with the disclosed embodiments.

Figure 5:
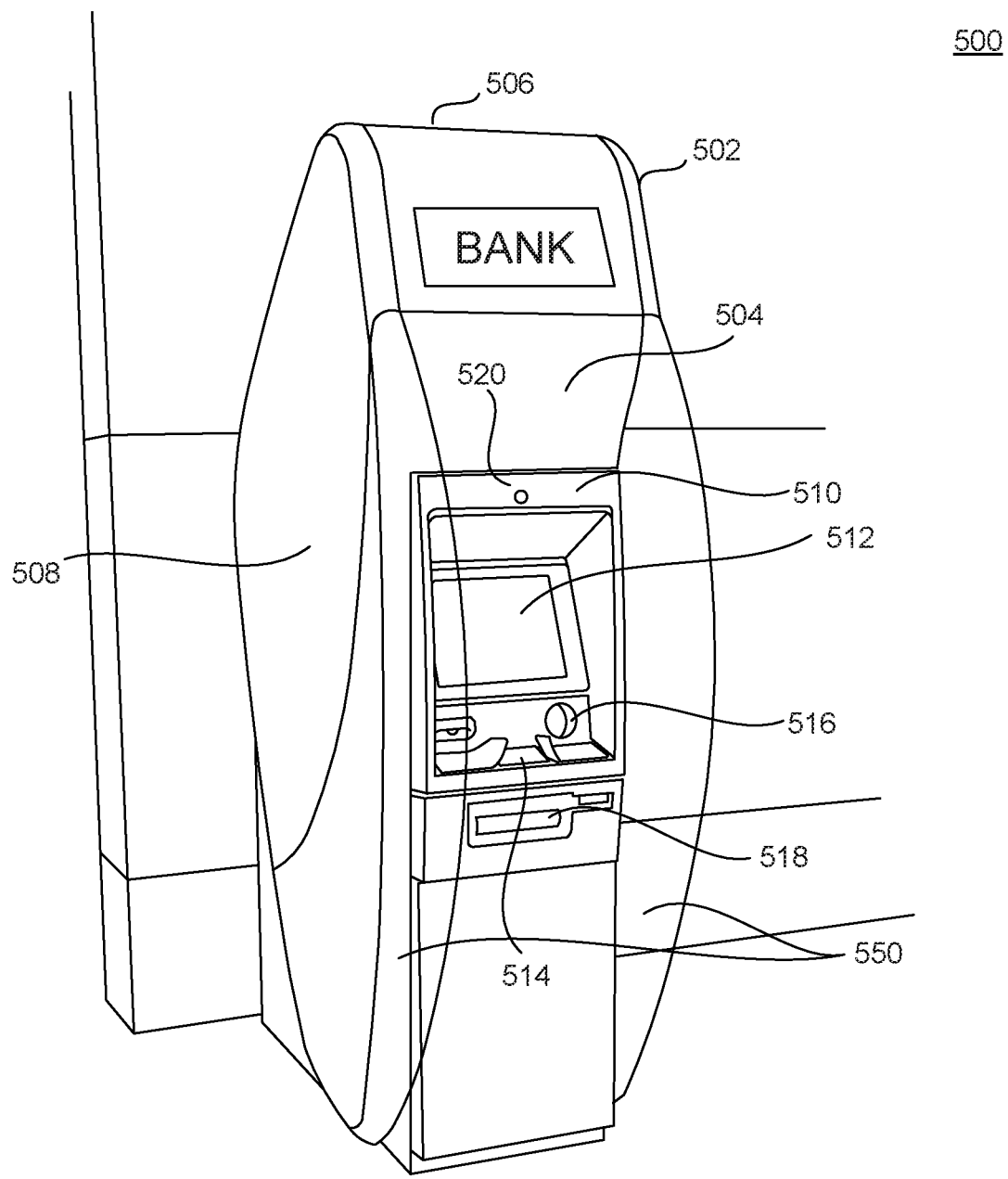
FIG. 5 depicts an exemplary ATM, consistent with disclosed embodiments.

FIG. 5 depicts an ATM 500 consistent with disclosed embodiments. ATM 500 may comprise a local FSP device, such as local FSP device 304 shown in FIG. 3, configured to enhance privacy via opacity changes in privacy barriers. In an embodiment, ATM 500 may include one or more privacy barriers that are transparent (i.e., allowing all or nearly all light to pass through without or with minimal dispersion or diffusion), translucent (i.e., allowing some light to pass through and/or with some dispersion and/or diffusion), or otherwise provide an open and inviting appearance, encouraging users to feel comfortable approaching ATM 500. ATM 500 may be configured to alter an opacity of the one or more privacy barriers, for example by increasing opacity when other traits are desired, such as privacy from surveillance or identity theft during a transaction.

ATM 500 may include a housing 502 that may encase valuables, such as currency, checks, deposit slips, etc., and/or electronic components, such as processors, memory devices, circuits, etc. Housing 502 may be made of various materials, including plastics, metals, polymers, woods, ceramics, concretes, paper, glass, etc. In some embodiments (and as depicted in FIGS. 6, 7, 9, and 10), housing 502 may have a different shape than the one shown in FIG. 5.

Housing 502 may include one or more surfaces. For example, exterior housing 502 may include a front surface 504, back surface (not shown in FIG. 5), top surface 506, bottom surface (not shown in FIG. 5), and side surface 508. The number of surfaces of housing surface 502 is not limited by the present disclosure.

In some embodiments, housing 502 may include fascia 510. In some embodiments, fascia 510 may be connected to any surface of exterior housing surface. As depicted, for illustrative purposes only, fascia 510 is connected to front surface 504 of housing surface 502. Fascia 510 may also be connected to multiple surfaces of housing 502. Fascia 510 may be made of a different material than housing 502. For example, fascia 510 may be made of plastic while housing 502 may be made of sheet metal.

Fascia 510 may include components, such as one or more displays 512, key panels 514, card readers 516, slots 518, and/or sensors 520. The components and/or the shapes of the components of fascia 510 are only illustrative. Other components may be included in ATM 500. In some embodiments, components, such as those shown in FIG. 5, may be replaced with other components or omitted from ATM 500.

Display 512 may include a Thin Film Transistor Liquid Crystal Display (LCD), In-Place Switching LCD, Resistive Touchscreen LCD, Capacitive Touchscreen LCD, an Organic Light Emitted Diode (©LED) Display, an Active-Matrix Organic Light-Emitting Diode (AMOLED) Display; a Super AMOLED, a Retina Display, a Haptic or Tactile touchscreen display, or any other display. Display 512 may be any known type of display device that presents information to a user operating ATM 500. Display 512 may be a touchscreen display, which allows the user to input instructions via display 512. Other components, such as key panels 514, card readers 516, and/or slots 518 may allow the user to input instructions.

Card reader 516 may allow a user to, in some embodiments, insert a transaction card into ATM 500. The transaction card may be associated with a financial service provider. Card reader 516 may allow ATM 500 to acquire and/or collect transaction information from the transaction card. In some embodiments, card reader 516 may allow a user to tap a transaction card or mobile device in front of card reader 516 to allow ATM 500 to acquire and/or collect transaction information from the transaction card via technologies, such as near-field communication (NFC) technology, Bluetooth™ technology, and/or radio-frequency identified technology, and/or wireless technology. Card reader 516 may also be connected with a mobile application, for example executed by user device 306, that allows the user to transfer transaction card information to card reader 516 and/or ATM 500 with or without inserting the transaction card.

Slots 518 may include one or more card slots (which may be connected to card reader 516), receipt slots, deposit slots, mini account statement slot, cash slot, etc. Slots 518 may allow a user of ATM 500 to insert or receive one or more receipts, deposits, withdrawals, mini account statements, cash, checks, money orders, etc.

Sensors 520 may include any number of sensors configured to observe one or more conditions related to ATM 500 or ATM 500's environment. Sensors 520 may include cameras, microphones, proximity sensors, pressure sensors, infrared sensors, motion sensors, vibration sensors, smoke sensors, etc. Sensor 502 as shown in FIG. 5 may be configured to detect a condition that may be observed from fascia 510, however, sensors 502 may be located at any appropriate location or locations of ATM 500. For example, an instance of sensor 502 may be a pressure sensor arranged as a mat, to detect the pressure of a user standing in front of ATM 500. Those of skill in the art will understand that numerous configurations of sensors 520 may be employed consistent with the present disclosure.

ATM 500 may include one or more privacy barriers 550. Privacy barriers 550 may be physical barriers configured to intersect one or more viewing angles of components of ATM 500, such as fascia 510 and/or display 512. That is, a privacy barrier 550 may be configured such that it is disposed between an observer and a component of ATM 500 when the observer views the component from certain areas outside of a space intended for a user of ATM 500. In an embodiment, a privacy barrier 550 may comprise a substantially flat surface extending outward from a front side of ATM 500, as shown in FIG. 5. Privacy barrier 550 may be composed of any suitable material or combination of materials, such as one or more of plastic, glass, metal, acrylic materials, etc.

Privacy barriers 550 may be configured such that when the observer views a component of ATM 500 from within a particular angle, the privacy barrier intersects the line of sight. Such intersection may partially or fully block the observer's view of the component. For example, a line of sight within an angle from a front side of ATM 500 may be intersected by privacy barrier 500. In some embodiments, such an angle at which privacy barrier 550 intersects the line of sight may vary depending on a horizontal or vertical disposition of the line of sight, or may be uniform along horizontal and vertical axes.

Privacy barriers 550 may be composed of materials such that privacy barriers 550 are transparent and/or translucent. This may make certain components or panels of ATM 500 visible from angles at which they would not be visible if privacy barriers 550 were not transparent and/or translucent. As shown in FIG. 5, portions of fascia 510 and display 512 are visible through transparent privacy barrier 550.

Privacy barriers 550 may be configured such that an opacity of the transparent and/or translucent portion of a privacy barrier may be adjusted. For example, a privacy barrier 550 may incorporate one or more of various technologies for controlling opacity, such as smart glass or switchable glass technology. Privacy barrier 550 may incorporate any one or more switchable glass technologies, such as electrochromic, photochromic, thermochromic, suspended-particle, micro-blind, liquid-crystal, or any other technology for controlling opacity. In some embodiments, as a part of or in addition to controlling opacity, privacy barrier 550 may include a display, such as a liquid crystal display (LCD), or an organic light-emitting diode display (OLED). Any known display technology may be employed, for example, any of the displays discussed above in relation to display 512.

Figure 2:
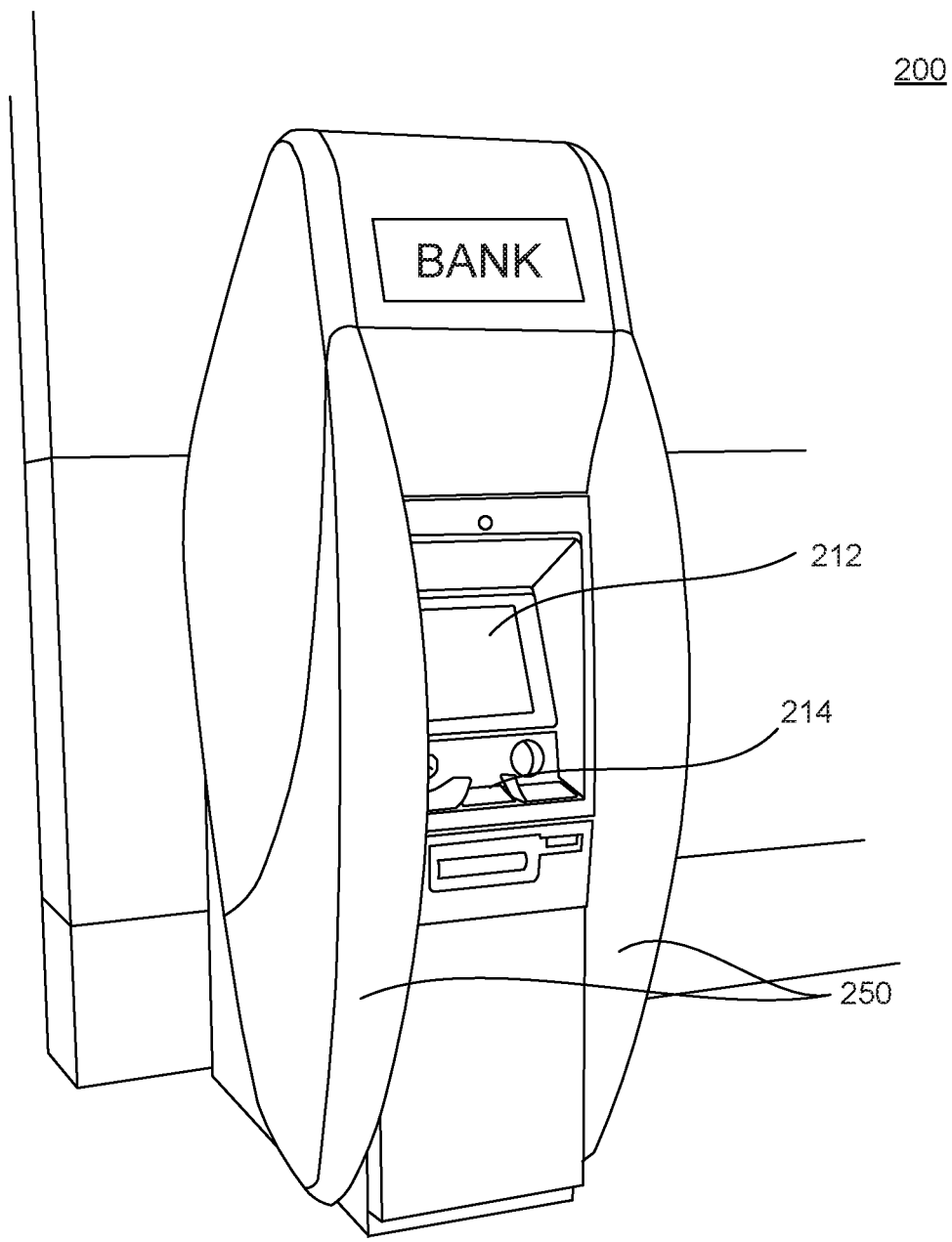
FIG. 2 depicts an exemplary ATM, consistent with disclosed embodiments.

Opacity of privacy barrier 550 may be controlled by one or more processors 410 of any one or more of local FSP device 304, FSP device 302, and user device 306. For example, processor 410 may control privacy barrier 550 to alter its opacity. Altering the opacity of privacy barrier 550 may comprises causing at least a portion of the physical barrier to become more opaque, more transparent, etc. For example, processor 410 may control privacy barrier 550 to cause a transparent portion of the physical barrier, as shown in FIG. 5, to be opaque (i.e., allowing no light to pass through), or substantially opaque, similar to privacy barriers 250, shown in FIG. 2. Therefore, changes in opacity may obscure one or more viewing angles of display. For example, a change in opacity may result in increased opacity of a privacy barrier 550 such that text cannot be read by an observer on an opposite side of the privacy barrier, or such that the activities and/or movements of a user of ATM 500 cannot be seen by an observer on an opposite side of the privacy barrier. Standards for transparency, translucency, opacity, etc. may be based on any appropriate industry standard, such as the ASTM D1003-13 Standard Test Method for Haze and Luminous Transmittance of Transparent Plastics, or a similar standard for a given privacy barrier construction material.

In an embodiment in which privacy barrier 550 includes a display, controlling opacity of privacy barrier 550 may comprise controlling the display, for example displaying an image via the display, or changing in image displayed via the display 512. Therefore obscuring one or more viewing angles of display 550 may comprise controlling a display of privacy barrier 550. In some embodiments, privacy barrier 550 may display information on a surface of a privacy barrier 550 facing toward a user of ATM 500, on a surface of the privacy barrier 550 facing away from the user, or both.

In an embodiment, opacity of a privacy barrier may be based on a determination that ATM 500 is in use. For example, based on a determination that a user is operating ATM 500, processor 410 may control privacy barrier 550 to alter an opacity of privacy barrier 550. The determination may be based on input from any of sensors 520, a touchscreen display 512, key panel 514, card reader 516 and/or any other input. For example, a determination that a user is operating ATM 500 may be based on input from at least one of a proximity sensor or a pressure plate, input received from a user via an interface such as a touch screen graphical user interface, or receipt of credential information provided to ATM 500 by the user, such as insertion of a transaction card into card reader 516.

Figure 6:
FIG. 6 depicts an exemplary ATM, consistent with disclosed embodiments.

FIG. 6 depicts an ATM 600. ATM 600 may include components similar to ATM 500, but in place of housing 502, fascia 510 may be connected to a wall 602. ATM 600 may include privacy barriers 650. Privacy barriers 650 may include any of the components or configurations described above regarding privacy barriers 550, but may extend from wall 602. Similar to privacy barriers 550, privacy barriers 650 may be physical barriers configured to intersect one or more viewing angles of components of ATM 600. As shown in FIG. 6, privacy barriers 650 may be transparent.

Figure 7:
FIG. 7 depicts an exemplary ATM, consistent with disclosed embodiments.

As with privacy barriers 550, privacy barriers 650 may be configured such that an opacity of a transparent and/or translucent portion of a privacy barrier 650 may be adjusted and/or controlled. Such adjustment may be achieved in any of the ways described above in relation to FIG. 5. FIG. 7 depicts ATM 600 with privacy barriers 650 controlled such that the privacy barriers are opaque.

Figure 8A:
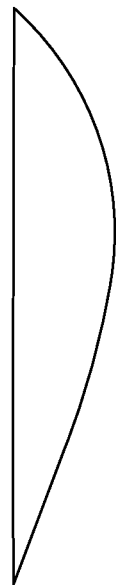
Figure 8B:
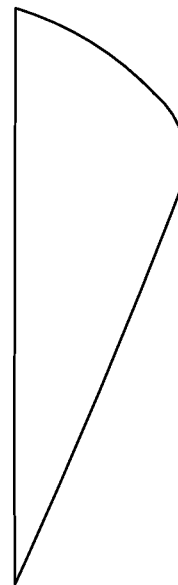
Figure 8C:
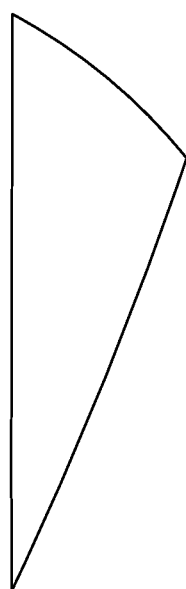
Figure 8D:
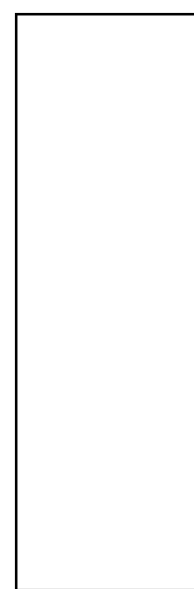

Privacy barriers, such as privacy barriers 550 and 650, may be any suitable shape for intersecting viewing angles of an ATM. FIGS. 8A, 8B, 8C, and 8O depict examples of ATM privacy barriers consistent with the present disclosure, that may be configured similarly to privacy barriers 550 and/or 650. The privacy barriers depicted in FIGS. 8A-8D may have various advantages, for example, the privacy barrier depicted in FIG. 8A may provide a more open impression to a user, while the privacy barrier depicted in FIG. 8D may intersect a wider swath of viewing angles of an ATM. Those of skill in the art will recognize that the privacy barriers depicted in FIGS. 8A-8O are merely examples, and that numerous shapes, sizes, curvatures, and other configurations may be employed by privacy barriers consistent with the present disclosure.

Figure 9A:
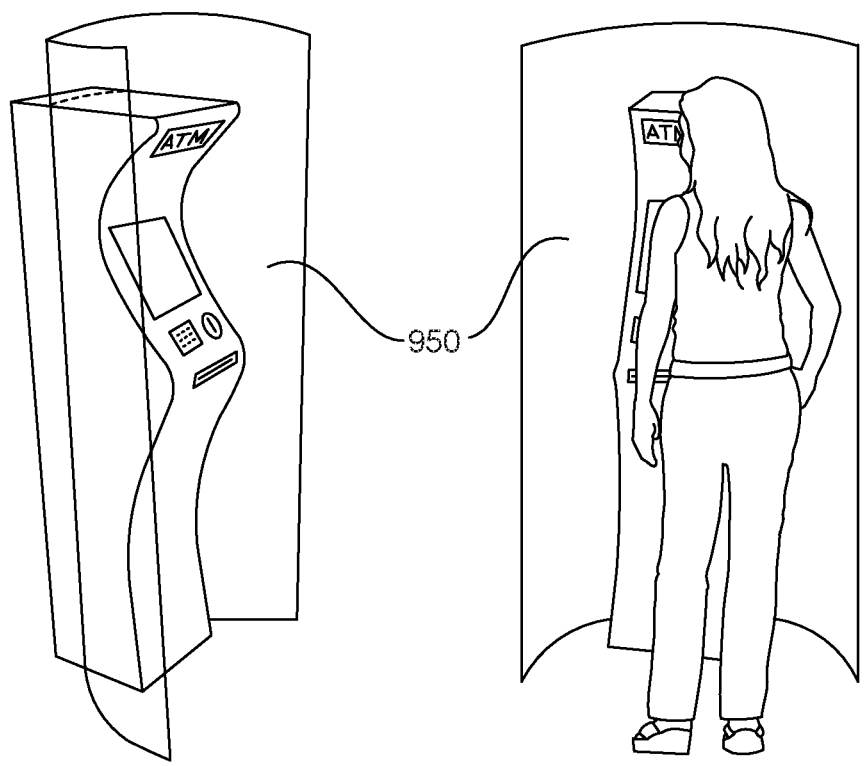
FIGS. 9A and 9B depict an exemplary ATM, consistent with disclosed embodiments.
Figure 9B:
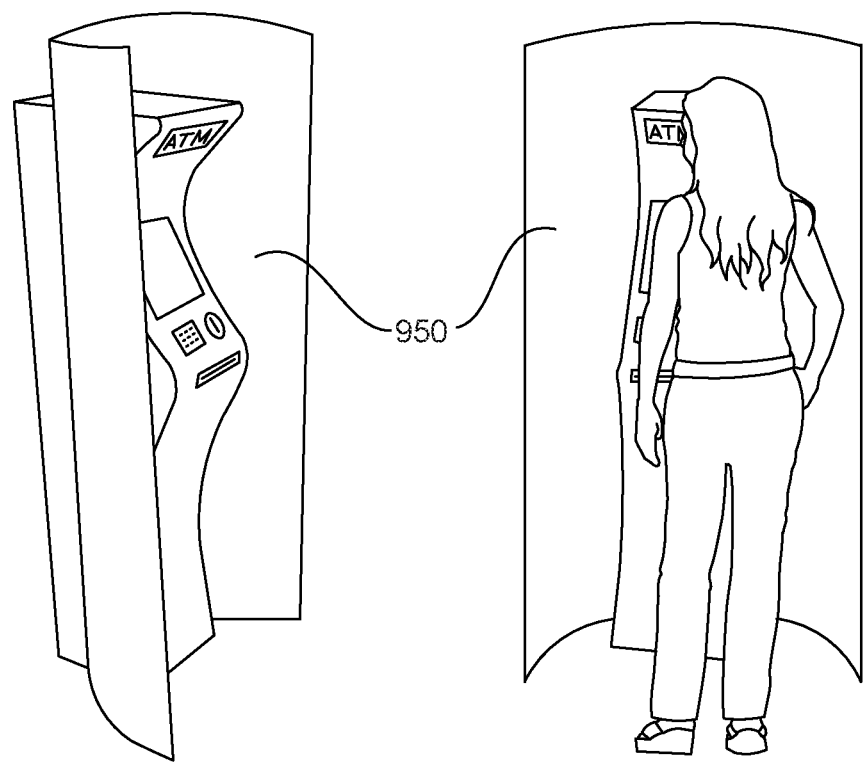

Privacy barriers configured such that opacity may be adjusted may be configured to intersect wider, greater, or different viewing angles without detriment to an experience of the user, and without discouraging users from interacting with an ATM. For example, FIGS. 9A and 9B depict an ATM 900. ATM 900 may comprise a configuration similar to ATMS 500 and/or 600 described above, but may include a privacy barrier 950. Privacy barrier 950 may be configured to form a partial enclosure around a front side of ATM 900.

As with privacy barriers 550 and 650, privacy barrier 950 may be configured such that at least a portion of privacy barrier 950 may be controlled to be transparent, translucent, opaque, etc. Such adjustment may be achieved in any of the ways described above in relation to FIGS. 5. and 7, for example. FIG. 9A depicts ATM 900 with privacy barrier 950 controlled such that the privacy barrier is transparent, and FIG. 9B. depicts ATM 900 with privacy barrier 950 controlled such that the privacy barrier is opaque.

Figure 10A:
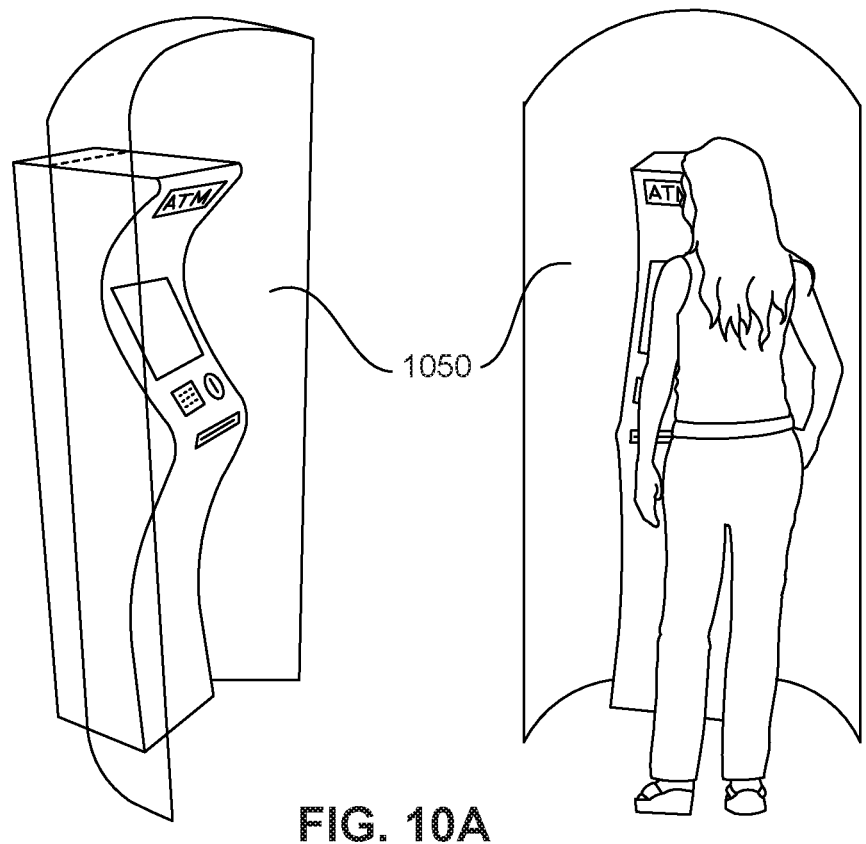
FIGS. 10A and 10B depict an exemplary ATM, consistent with disclosed embodiments.
Figure 10B:
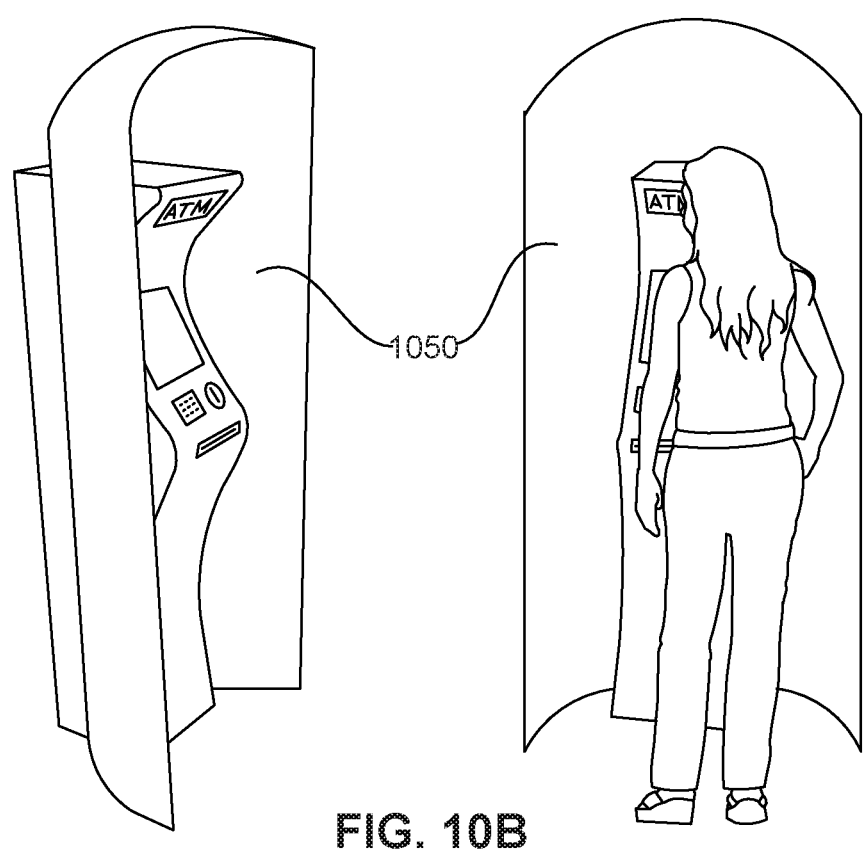

FIGS. 10A and 10B depict an ATM 1000. ATM 1000 may comprise a configuration similar to ATM 900 described above, but may include a privacy barrier 1050. Privacy barrier 1050 may be configured to form a partial enclosure around a front side of ATM 900 more complete than that of privacy barrier 950. More specifically, privacy barrier 1050 may intersect not only viewing angles to the sides of ATM 900 but also above the ATM. Privacy barrier 1050 may thereby provide a ore complete privacy barrier than barriers 550, 650, or 950.

As with privacy barriers 550, 650, and 950 privacy barrier 1050 may be configured such that at least a portion of privacy barrier 1050 may be controlled to be transparent, translucent, opaque, etc. Such adjustment may be achieved in any of the ways described above in relation to FIGS. 5. and 7, for example. FIG. 10A depicts ATM 1000 with privacy barrier 1050 controlled such that the privacy barrier is transparent, and FIG. 10B. depicts ATM 1000 with privacy barrier 1050 controlled such that the privacy barrier is opaque.

Figure 11:
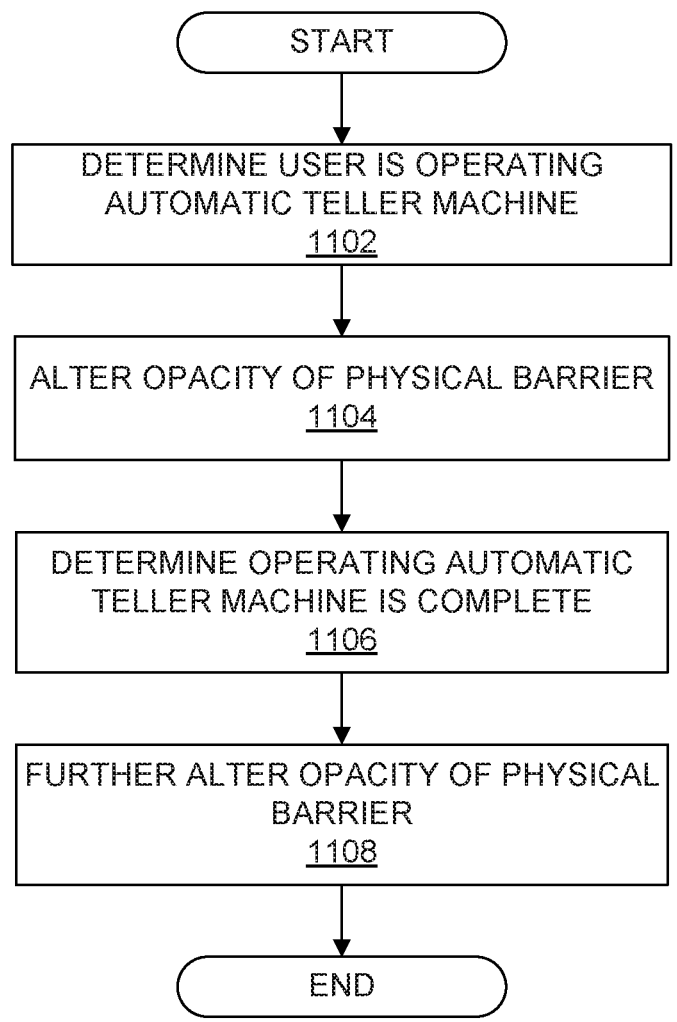
FIG. 11 is a flowchart of an exemplary process for altering opacity of an ATM privacy barrier, consistent with disclosed embodiments.

FIG. 11 shows an exemplary process for ATM security, consistent with disclosed embodiments. Process 1100 may be performed by processor 410 of, for example, a local FSP device 304, executing instructions encoded on a computer-readable medium storage device for providing ATM functionality. It is to be understood, however, that one or more steps of process 1100 may be implemented by other components of system 100 (shown or not shown), including, FSP device 302 and/or user device 306. Process 1100 may be employed by any of ATMs 500, 600, 900, and 1000.

At step 1102, local FSP device 304 may determine that a user is operating local FSP device 304. Determining that the user is operating local FSP device 304 may comprise detecting a user's presence at local FSP device 304. For example, determining at step 1102 may be based on input from a sensor such as any of sensors 520. For example, a proximity sensor may detect a user within a predetermined distance of local FSP device 304, or a pressure plate may detect the weight of a user standing on a surface near local FSP device 304. In some embodiments, in addition to detecting the presence of a user, FSP device 304 may determine whether one or more other persons are present within a predetermined proximity to local FSP device 304, using the same or different sensors as those employed to detect the user.

Additionally or alternatively, determining that the user is operating local FSP device 304 may also comprise determining that a user is interacting with or operating local FSP device 304. For example, determining at step 1102 may be based on receiving input by a user via an interface of the automatic teller machine. For example, determining may be based on receiving input via an interface displayed via a display 512, a keypress via a key panel 514, insertion of a card or other object into a card reader 516 and/or slot 518, etc.

The determining at step 1102 may be based on receiving credential information provided to local FSP device 304 by the user. Credential information may comprise identifying information such as an account number, personal identification number (PIN), social security number, biometric information etc. As an example, a user may insert a transaction card such as a credit, debit, or ATM card into a card reader 516 in order to identify the user's association with a financial service provider. FSP device 304 may also receive a fingerprint, iris scan, or voice sample provided to a sensor in communication with local FSP device 304. Alternatively, FSP device 304 may receive authentication via a wired or wireless connection with user device 306.

At step 1104, local FSP device 304 may alter an opacity of a physical barrier based on the determining of step 1102. At step 1104 local FSP device 304 may alter the opacity of a privacy barrier such as any of privacy barriers 550, 650, 950, and 1050. For example, local FSP device 304 may alter the opacity of a privacy barrier from transparent or translucent to opaque, substantially opaque, or more opaque than prior to altering opacity.

Figure 12A:
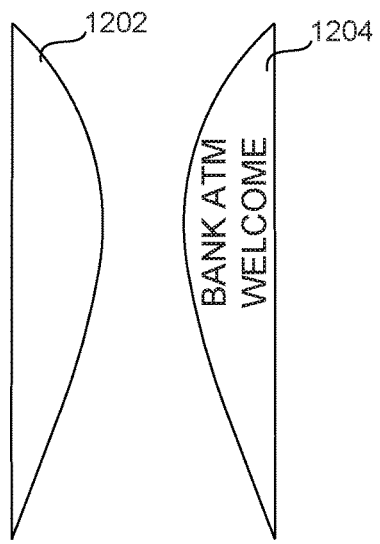

In some embodiments, altering the opacity of the privacy barrier at step 1102 may comprise controlling a display of the privacy barrier to at least partially obscure one or more viewing angle of local FSP device 304. For example, FIGS. 12A-12F depicts examples of privacy barriers incorporating a display. In an embodiment, obscuring the viewing angles of local FSP device 304 may comprise controlling a display to display information on a surface of the physical barrier facing toward the user. FIG. 12A depicts an example of a privacy barrier controlled at step 1102 to display a welcome message to a user, for example upon approaching local FSP device 304. Ref. 1202 depicts and an outside view of the privacy barrier, which may be opaque or upon activation of the display. Ref. 1204 depicts an inside view of the privacy barrier, facing the user. The message shown in FIG. 12A is merely an example. Any message to the user may be displayed on the privacy barrier.

Figure 12B:
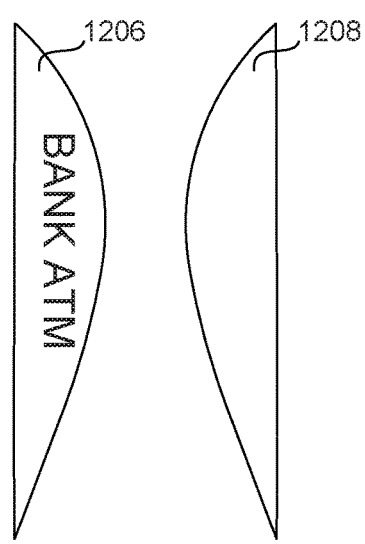
Figure 12C:
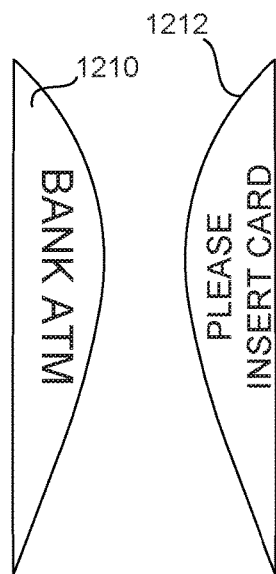

In an embodiment, obscuring the viewing angles of local FSP device 304 may comprise controlling a display to display information on a surface of the physical barrier facing away from the user. FIG. 12B depicts an example of a privacy barrier controlled at step 1102 to display a bank logo, which may be displayed, for example, upon a user approaching local FSP device 304. Ref. 1206 depicts and an outside view of the privacy barrier, displaying the logo. Ref. 1208 depicts an inside view of the privacy barrier, facing the user, which may be opaque upon activation of the display. The use of a logo, as in FIG. 12B, is merely an example. Any message may be displayed on the privacy barrier. Furthermore, as shown in FIG. 120, altering the opacity of the privacy barrier, may comprise controlling a display to display information on multiple sides and/or surfaces of the privacy barrier. Ref. 1210 depicts an outside view of the privacy barrier, displaying the logo. Ref. 1212 depicts an inside view of the privacy barrier, facing the user, providing an instruction to the user.

Figure 12D:
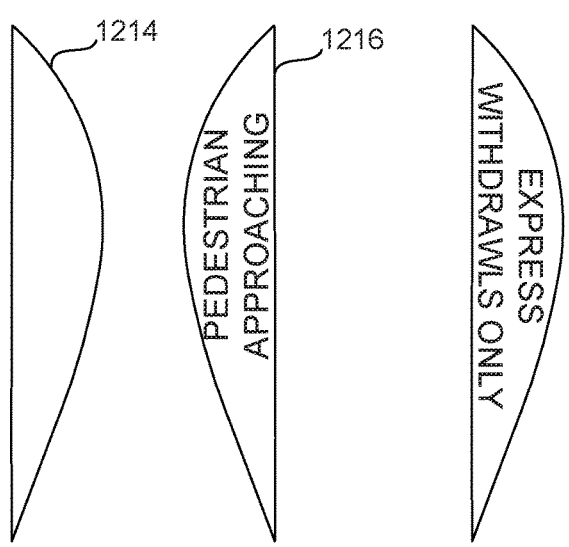
Figure 12E:
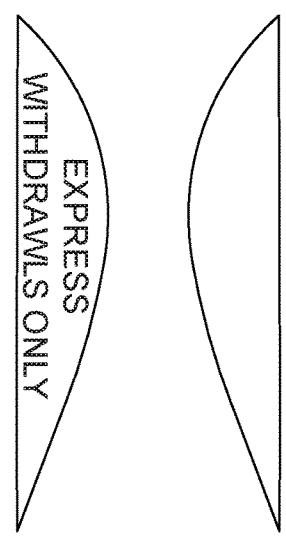

In some embodiments, information may be displayed on a privacy barrier to replace awareness reduced by the presence of the privacy barrier. For example, as discussed above, FSP device 304 may determine whether one or more other persons other than the user are present within a predetermined proximity to local FSP device 304. Such persons may be located along a line of sight obscured from the user's view by the privacy barrier. Local FSP device 304 may control a display of the privacy barrier to display a message indicating to the user the presence of the other person or persons. FIG. 12D depicts an example of a privacy barrier displaying such a message. Ref. 1214 depicts an outside view of the privacy barrier, and ref. 1216 depicts an inside view of the privacy barrier, including the message "PEDESTRIAN APPROACHING". In some embodiments privacy barriers may be configured to display other context or specific or situationally specific information such as the privacy barrier shown in FIG. 12E designating a local FSP device 304 as for withdrawals only or the privacy barrier shown in FIG. 12F providing instructions for a user to remove a transaction card from an ATM.

Referring back to FIG. 11, at step 1106, local FSP device 304 may determine that the operating of local FSP device 304 is complete. The determination at step 1106 may be based on any known event signifying the completion of a transaction at an ATM. For example, upon receiving a withdrawal, completing a deposit, removing a transaction card, etc. In some embodiments, local FSP device 304 may determine that the operating is complete based on a determination that a predetermined period of time has elapsed since determining that the user is operating the automatic teller machine at step 1102. Additionally or alternatively, local FSP device 304 may determine that operating is complete upon a predetermined period of inactivity. That is, local FSP device 304 may determine that operating is compete upon determining that a period of time has elapsed without a change in input of sensors 520, input from the user, etc.

In some embodiments, determining that the operating is complete may comprise determining that an authentication of the user has failed. For example, local FSP device 304 may determine that authentication has failed upon determining that credential information such as a personal identification number has been incorrectly entered, or incorrectly a predetermined number of times. Furthermore, determining that the operating is complete comprises determining that the user has been within a predetermined proximity of the automatic teller machine for a predetermined amount of time without providing credential information.

Figure 12F:
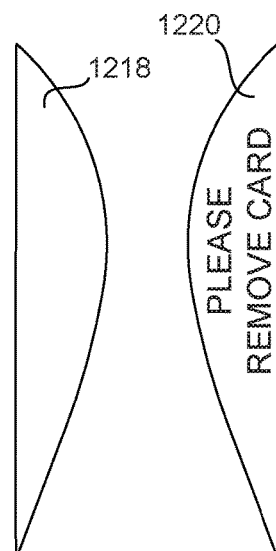

At step 1108, local FSP device 304 may further alter the opacity of the physical barrier. For example, local FSP device 304 may alter the opacity of a privacy barrier based on the determination at step 1106 that operating the ATM is complete. At step 1108, local FSP device 304 may change the opacity of the physical barrier to cause at least a portion of the physical barrier to become less opaque. For example, FSP device 304 may change the opacity of the privacy barrier to a level the same as or similar to that of before the operating of the ATM. Alternatively, changing the opacity of the privacy barrier at step 1108 may comprise controlling a display of the privacy barrier to display a message, as shown in FIG. 12F. Ref. 1218 depicts an outside view of the privacy barrier, and ref. 1212 depicts an inside view of the privacy barrier, facing the user, providing an instruction reminding the user to remove a transaction card from the ATM.

In some examples, some or all of the logic for the above-described techniques may be implemented as a computer program or application or as a plug in module or sub component of another application. The described techniques may be varied and are not limited to the examples or descriptions provided.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, while a financial service provider has been described herein as the entity detecting and identifying customers, it is to be understood that consistent with disclosed embodiments another entity may provide such services in conjunction with or separate from a financial service provider.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

What is claimed is:

1. An automatic teller machine comprising:
   a first display;
   a physical barrier configured to intersect one or more viewing angles of the first display, the physical barrier comprising a second display;
   one or more memory devices storing instructions;
   one or more processors configured to execute the instructions to perform operations comprising:
   determining that a user is operating the automatic teller machine;
   detecting a presence of at least one person other than the user within a predetermined proximity to the automatic teller machine, the at least one other person being located along a line of sight obscured from the user's view by the physical barrier; and
   controlling the second display to at least partially obscure the viewing angles of the first display, the viewing angles comprising a viewing angle between the at least one other person and the first display.

2. The automatic teller machine of claim 1, wherein the physical barrier comprises a substantially flat surface extending outward from a front side of the automatic teller machine.

3. The automatic teller machine of claim 1, wherein the physical barrier forms a partial enclosure around a front side of the automatic teller machine.

4. The automatic teller machine of claim 1, wherein obscuring the viewing angles of the first display comprises controlling the second display to display information on a surface of the physical barrier facing away from the user.

5. The automatic teller machine of claim 1, wherein obscuring the viewing angles of the first display comprises controlling the second display to display information on a surface of the physical barrier facing toward the user.

6. The automatic teller machine of claim 5, wherein:
   the operations further comprise detecting a presence of at least one person other than the user within a predetermined proximity to the automatic teller machine; and
   obscuring the viewing angles of the first display comprises controlling the second display to display an indication of the presence of the at least one person.

7. The automatic teller machine of claim 1, wherein obscuring the viewing angles of the first display comprises controlling the second display to display information on a surface of the physical barrier facing toward the user and on a surface of the physical barrier facing away from the user.

8. The automatic teller machine of claim 1, wherein prior to obscuring the viewing angles the physical barrier is one of transparent or translucent.

9. The automatic teller machine of claim 1, wherein the physical barrier comprises at least one of a liquid crystal display or an organic light-emitting diode display.

10. The automatic teller machine of claim 1, wherein the determining is based on input from at least one of a proximity sensor or a pressure plate.

11. The automatic teller machine of claim 1, wherein the determining is based on receiving input by a user via an interface of the automatic teller machine.

12. The automatic teller machine of claim 1, wherein the determining is based on insertion of a transaction card into the automatic teller machine by the user.

13. The automatic teller machine of claim 1, wherein the operations further comprise:
   determining that the operating the automatic teller machine is complete; and
   upon determining that the operating the automatic teller machine is complete, controlling the second display to display a message.

14. The automatic teller machine of claim 13, wherein the message comprises a reminder to the user to remove a transaction card from the automatic teller machine.

15. The automatic teller machine of claim 13, wherein determining that the operating is complete comprises determining that a predetermined period of time has elapsed since the determining that the user is operating the automatic teller machine.

16. The automatic teller machine of claim 13, wherein determining that the operating is complete comprises determining that a predetermined period of inactivity has elapsed.

17. The automatic teller machine of claim 13, wherein determining that the operating is complete comprises determining that an authentication of the user has failed.

18. The automatic teller machine of claim 13, wherein determining that the operating is complete comprises determining that the user has been within a predetermined proximity of the automatic teller machine for a predetermined amount of time without providing credential information.

19. A method for providing automatic teller machine security, the method comprising the following operations performed by one or more hardware processors:
  determining that a user is operating an automatic teller machine, the automatic teller machine comprising:
    a first display, and
    a physical barrier configured to intersect one or more viewing angles of the first display, the physical barrier comprising a second display;
  detecting a presence of at least one person other than the user within a predetermined proximity to the automatic teller machine, the at least one other person being located along a line of sight obscured from the user's view by the physical barrier; and
  control the second display such that the second display at least partially obscures the viewing angles of the first display, the viewing angles comprising a viewing angle between the at least one other person and the first display.

20. A non-transitory computer-readable medium storing instructions that, when executed by a processor, cause the processor to operate an automatic teller machine by performing operations comprising:
  determining that a user is operating an automatic teller machine, the automatic teller machine comprising:
    a first display, and
    a physical barrier configured to intersect one or more viewing angles of the first display, the physical barrier comprising a second display;
  detecting a presence of at least one person other than the user within a predetermined proximity to the automatic teller machine, the at least one other person being located along a line of sight obscured from the user's view by the physical barrier; and
  control the second display such that the second display at least partially obscures the viewing angles of the first display, the viewing angles comprising a viewing angle between the at least one other person and the first display.

* * * * *